US008159489B2

(12) United States Patent
Nakamura et al.

(10) Patent No.: US 8,159,489 B2

(45) Date of Patent: Apr. 17, 2012

(54) DISPLAY APPARATUS AND INTEGRATED CIRCUIT

(75) Inventors: Kohichi Nakamura, Kawasaki (JP); Masami Iseki, Yokohama (JP); Fujio Kawano, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 736 days.

(21) Appl. No.: 12/274,863

(22) Filed: Nov. 20, 2008

(65) Prior Publication Data

US 2009/0135110 A1 May 28, 2009

(30) Foreign Application Priority Data

Nov. 22, 2007 (JP) ................................ 2007-303063

(51) Int. Cl.

*G06F 3/038* (2006.01)
*G09G 5/00* (2006.01)
*G09G 3/30* (2006.01)

(52) U.S. Cl. ......................................... 345/215; 345/76

(58) Field of Classification Search ................... 345/215
See application file for complete search history.

(56) References Cited

U.S. PATENT DOCUMENTS

| | | | | |
|---|---|---|---|---|
| 7,710,362 | B2 * | 5/2010 | Cho | 345/75.2 |
| 2005/0122150 | A1 | 6/2005 | Iseki et al. | 327/215 |
| 2006/0114195 | A1 | 6/2006 | Yamashita et al. | 345/76 |
| 2006/0132395 | A1 | 6/2006 | Kawasaki et al. | 345/75.2 |

FOREIGN PATENT DOCUMENTS

JP 2000-105566 4/2000

OTHER PUBLICATIONS

Boost Converter Lab (NPL, 2005, available at http://www.cohortviii.com/~matthes/projects/boost_conv.pdf).*

* cited by examiner

*Primary Examiner* — Quan-Zhen Wang
*Assistant Examiner* — Nelson D Runkle, III
(74) *Attorney, Agent, or Firm* — Fitzpatrick, Cella, Harper & Scinto

(57) ABSTRACT

A display apparatus includes an image display unit including electro-optic elements and pixel drive circuits arranged two-dimensionally in row and column directions, a first power supplying line for supplying a first potential to the image display unit, and plural data lines severally connected to columns of the image display unit for supplying data signals to the pixel circuits. In addition, plural scanning lines cross the data lines, a data line drive circuit drives the data lines, and a scanning line drive circuit drives the scanning lines. A second potential is supplied to the scanning line drive circuit through a second power supplying line, and the display apparatus is provided with elements for shifting potential of the scanning lines to the first potential of the first electric power supplying line when the second potential is lower than the first potential.

4 Claims, 3 Drawing Sheets

DISPLAY APPARATUS AND INTEGRATED CIRCUIT

BACKGROUND OF THE INVENTION

1. Field of the Invention

The present invention relates to a display apparatus and an integrated circuit, and more particularly to a display apparatus including electro-optic elements arranged in a matrix form.

2. Description of the Related Art

In recent years, display apparatuses using electroluminescence elements (hereinafter referred to as EL elements) have been watched as a display apparatus replacing a cathode ray tube (CRT) and a liquid crystal display (LCD). Among them, the application development of an organic EL element, which is a current control type light emitting element, the light emission brightness of which is controlled by a current flowing through the element, has been actively performed. In particular, an organic EL display including its peripheral circuitry uses thin film transistors (TFTs) not only in its display region, but also in the peripheral circuitry.

FIG. 5 illustrates an example of the whole configuration of a conventional display apparatus (organic EL display). In the configuration of FIG. 5, an image display unit (display region) 20 includes a plurality of EL elements 7 and a plurality of pixel circuits 6 for severally driving the EL elements 7. The EL elements 7 and the pixel circuits 6 are arranged in the row direction and column direction of the matrix form in the image display unit 20. Moreover, a data line drive circuit 21 is connected to each column of the image display unit 20 to drive a plurality of data lines 5 for supplying data signals to the pixel circuits 6. Furthermore, a scanning line drive circuit 3 drives a plurality of scanning lines 4 crossing the data lines 5. By the configuration, the display apparatus controls the voltages and currents supplied from the data line drive circuit 21 to the EL elements 7 through the data lines 5 of the respective columns, the time when the voltages and the currents are supplied, and the like, with the signals transmitted from the scanning line drive circuit 3 to the respective pixel circuits 6 through the scanning lines 4 of the respective rows. The brightness of each of the EL elements 7 is adjusted in this manner, and gradation display is performed.

FIG. 4 illustrates the circuit configuration diagram of a pixel of the conventional display apparatus. The circuit configuration shown in FIG. 4 includes one of the pixel circuits 6 using a current setting method, and the circuit operation of the pixel circuit 6 is described by using the current setting method.

The configuration illustrated in FIG. 4 includes the scanning line drive circuit 3, the scanning line 4, driven by the scanning line drive circuit 3, the data line 5, driven by the data line drive circuit 21 (illustrated in FIG. 5), the pixel circuit 6, constituting the image display unit 20, the EL element 7, driven by the pixel circuits 6, a holding capacitor 9 in the pixel circuit 6, a first power supplying line 1 for supplying first electric power (potential) V1 to the image display unit 20, and a second power supplying line 2 for supplying second electric power (potential) V2 to the scanning line drive circuit 3.

Part of the scanning line drive circuit 3 includes a two-stage inverter circuit including p type and n type transistors Tr1 and Tr2, respectively, at the first stage thereof and p type and n type transistors Tr3 and Tr4, respectively, at the second stage thereof, which transistors Tr1 and Tr2, and Tr3 and Tr4 are connected in series with each other at the respective first and second stages between the second power supplying line 2 and the earthing wire GND. Hence, the part of the scanning line drive circuit 3 outputs a signal S2 having the low or high level of the logical levels to the scanning line 4 according to an input signal S1.

The pixel circuit 6 includes a drive transistor (p type TFT) M1, n type transistors (n type TFTs) M2 and M3 as switching elements, the on-off operations of which are controlled by a signal on the scanning line 4, and a p type transistor (p type TFT) M4. The source terminal of the drive transistor M1 is connected to the first power supplying line 1, and the drain terminal thereof is connected to the EL element 7 through the source and drain terminals of the transistor M4. A holding capacitor 9 is connected between the gate terminal of the drive transistor M1 and the first power supplying line 1. The transistor M2 is arranged between the gate terminal of the drive transistor M1 and the drain terminal thereof. The connection point of the drain terminal of the drive transistor M1 and the transistor M4 is connected to the data line 5 through the transistor M3.

When a current signal is set in the pixel circuit 6 in this configuration, a current signal Idata, which is input from the data line 5 into the EL element 7, is transmitted. At this time, a signal S2 on the scanning line 4 is in the high level. Consequently, the transistors M2 and M3 are on, and the transistor M4 is off, so that the drive transistor M1 and the EL element 7 are in non-connected states with each other. Consequently, no currents flow through the EL element 7. Hence, a voltage according to the current driving ability of the drive transistor M1 is generated in the holding capacitor 9 and arranged between the gate terminal of the drive transistor M1 and the first power supplying line 1 by the input current signal Idata.

Next, the signal S2 on the scanning line 4 shifts to a low level, and the transistors M2 and M3 are turned off, and the transistor M4 is turned on. A current according to the voltage held in the holding capacitor 9 is generated by the drive transistor M1, and the current is supplied to the EL element 7. Thereby, the EL element 7 emits light of the brightness according to the supplied current Idata.

The case is examined where the first power supplying line 1 of the pixel circuit 6 and the second power supplying line 2 of the scanning line drive circuit 3 are powered on in that order at the time of power source activation in the display apparatus having the circuit configuration illustrated in FIG. 4. In this case, the potential level of the signal S2 on the scanning line 4 is the low level in the period in which the first power supplying line 1 is powered on and the second power supplying line 2 is not powered on. Consequently, the transistors M2 and M3 are off, and the transistor M4 is on. At this time, if there is an indeterminate potential difference between both ends of the holding capacitor 9, then a current according to the potential difference is generated by the drive transistor M1. Furthermore, since the transistor M4 is on, the drive transistor M1 and the EL element 7 are connected with each other, and the current generated by the drive transistor M1 is supplied to the EL element 7, so that the EL element 7 emits light.

Moreover, the case is examined where the second power supplying line 2 and the first power supplying line 1 are turned off in that order at the time when the power source is turned off. In this case, the potential level of the signal S2 on the scanning line 4 is the low level in the period in which the second power supplying line 2 is powered off and the first power supplying line 1 is not powered off yet, and the transistors M2 and M3 are off and the transistor M4 is on. At this time, since the drive transistor M1 and the EL element 7 are connected to each other, a current according to the potential difference between both ends of the holding capacitor 9 is generated by the drive transistor Ml, and the generated current flows through the EL element 7. As the result, the EL element 7 emits light of the brightness according to the current generated by the drive transistor M1 during the period until the first power supplying line 1 is powered off.

As a unit for preventing the malfunctions at the time of power source activation, Japanese Patent Application Laid-Open No. 2000-105566 describes a display drive integrated circuit equipped with a power source sequence control unit for controlling the order of power source activation. The power source sequence control unit performs the power source sequence control by providing power source connecting switches to power supplying lines.

However, if a switch is provided to a power supplying line capable of making a large current flow, then the power source connecting switch is needed to be enlarged to make the switch itself have a low resistance, and a problem of the enlargement of a circuit area is caused.

SUMMARY OF THE INVENTION

It is an aspect of the present invention to provide a display apparatus and an integrated circuit, each being provided with a plurality of power supplying lines and being able to achieve the prevention of the aforesaid malfunctions at the time of power source activation and at the time of the turning-off of the power source with a simple circuit configuration and without enlarging circuit area. That is, the present invention provides a display apparatus and an integrated circuit both capable of preventing the malfunctions such as uncontrolled light emission of EL elements owing to a power source activation order at the time of power source activation and the malfunctions such as uncontrolled light emission of the EL elements owing to a power source deactivation order at the time of the turning-off of the power source.

According to an aspect of the present invention, a display apparatus of the present invention comprises: an image display unit including a plurality of electro-optic elements and a plurality of pixel circuits for respectively driving the plurality of electro-optic elements, the electro-optic elements and the pixel circuits being arranged in row direction and column direction of the matrix form; a first power supplying line for supplying first potential to the image display unit; a plurality of data lines connected respectively to the pixel circuit arranged in the column direction for supplying data signals to the pixel circuits; a data line drive for driving the plurality of data lines; a plurality of scanning lines connected respectively to the pixel circuits arranged in the row direction for selecting the pixel circuits; and a scanning line drive circuit for driving the plurality of scanning lines; and a second power supplying line for supplying second potential to the scanning line drive circuit, wherein second potential is supplied to the scanning line drive circuit through a second power supplying line, wherein the display apparatus is provided with elements for shifting potential of the plurality of scanning lines to the first potential when the first potential and the second potential are different from each other.

In the present aspect, the elements may be arranged to change the potential of the scanning lines to the first potential when the second potential is lower than the first potential.

In the present aspect, each of the elements may be arranged to include a switching element provided between the first power supplying line and each of the scanning lines, and a control terminal of the switching element may be connected to the second power supplying line. Moreover, the electro-optic elements may be electroluminescence elements.

According to another aspect of the present invention, an integrated circuit comprises: a first power supplying line having a first potential; a second power supplying line having a second potential; a first circuit unit connected to the first power supplying line; and a second circuit unit connected to the second power supplying line, wherein an input of the first circuit unit is connected to an output of the second circuit unit, and the integrated circuit further comprises an element for shifting an output of the second circuit unit to the first potential when the second potential is lower than the first potential.

According to the present invention, in the display apparatus including a plurality of power supplying lines, it is possible to prevent any malfunctions, such as uncontrolled light emission of the EL elements, regardless of the order of power source activation at the time of power source activation and of the order of power source deactivation at the time of the turning-off of the power source.

An information display apparatus can be configured by using the above-mentioned display apparatus. The information display apparatus may have the form of, for example, any of a portable telephone, a portable computer, a still camera, and a video camera. Alternatively, the information display apparatus may be an apparatus realizing a plurality of functions of the above-mentioned equipment. The information display apparatus is equipped with an information input unit. For example, if the information display apparatus is a portable telephone, then the information input unit thereof is configured to include an antenna. If the information display apparatus is a personal digital assistant (PDA) or a portable computer, then the information input unit thereof is configured to include an interface unit to a network. If the information display apparatus is a still camera or a movie camera, then the information input unit thereof is configured to include a sensor unit, such as a charge coupled device (CCD). In this case, the sensor unit may be one using a complementary metal oxide semiconductor (CMOS).

Further features of the present invention will become apparent from the following description of exemplary embodiments with reference to the attached drawings.

DETAILED DESCRIPTION OF THE INVENTION

In the following, exemplary embodiments of a display apparatus of the present invention will be described in detail with reference to the accompanying drawings.

Each of the present exemplary embodiments is applied to an active matrix type display apparatus using EL elements, the light emission brightness of which is controlled by input currents, as electro-optic elements. That is, the display apparatus includes a display region, in which pixels are arranged in a matrix form, each pixel including an EL element and a pixel circuit including a TFT element for controlling the current to be input into the EL element. Moreover, the display apparatus includes a data line drive circuit, allocated to the pixels in respective columns to output data signals onto data lines for controlling the currents input into the pixel circuits, and a scanning line drive circuit outputting scanning signals to be input into the pixel circuits to scanning lines, as peripheral circuitry arranged on the outside of the display region.

Moreover, a first potential is supplied to the pixel circuits through a first power supplying line, and a second potential is supplied to the scanning line drive circuit through a second power supplying line. Switching elements are provided between the first power supplying line and the scanning lines, the control terminals of the switching elements are connected to the second power supplying line.

According to each of the present exemplary embodiments, in a display apparatus provided with a plurality of power supplying lines, it is possible to prevent malfunctions, such as uncontrolled light emission of EL elements, which can be caused by the order of power source activation and the order of power source deactivation.

First Embodiment

First, a first embodiment of the present invention is described with reference to FIG. 1.

Figure 1:
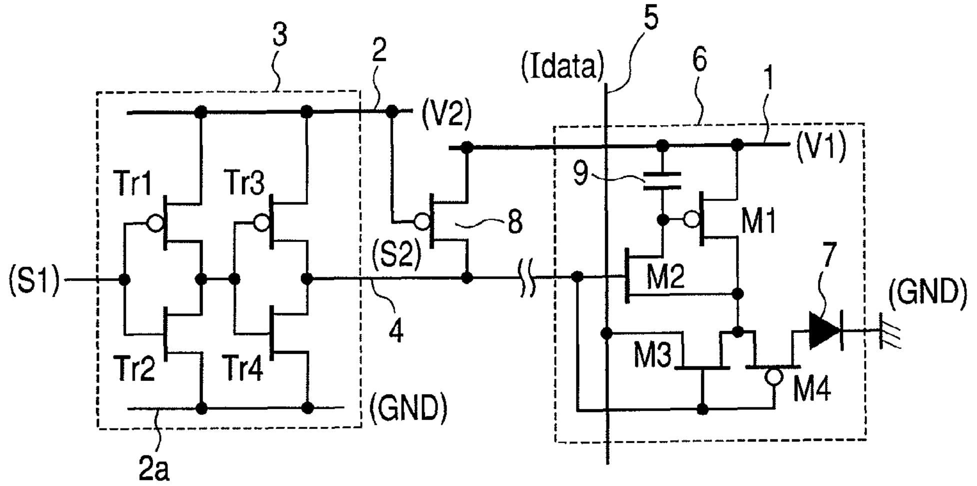
FIG. 1 is a diagram illustrating an example of the circuit configuration of a display apparatus according to a first embodiment of the present invention.
Figure 5:
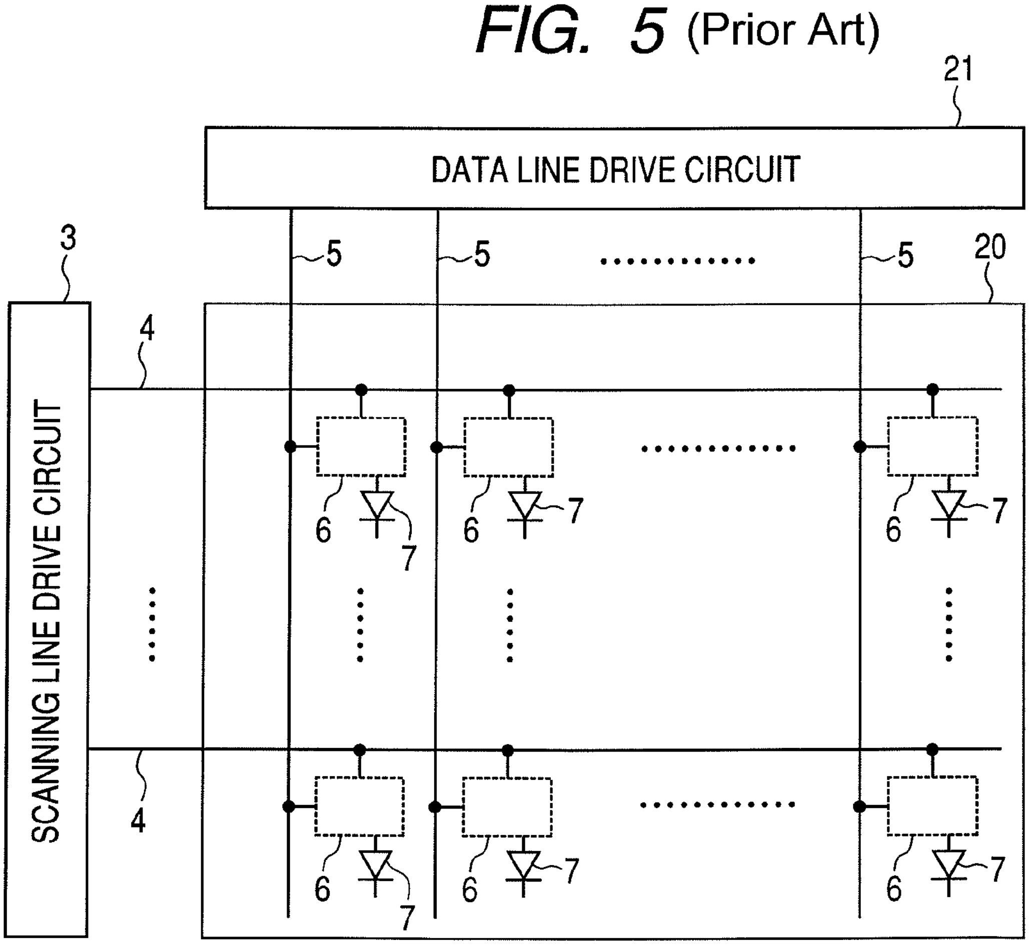
FIG. 5 (Prior Art)
FIG. 5 is a diagram illustrating an example of the whole configuration of the conventional display apparatus.

FIG. 1 illustrates an example of a part of the circuit configuration of a display apparatus including pixel circuits using the current setting method of the present embodiment. Incidentally, because the whole configuration of the display apparatus, that is, the configuration including an image display unit, in which EL elements and the pixel circuits are arranged in the row directions and column direction of the matrix form in the image display unit, and a scanning line drive circuit and a data line drive circuit, which constitute the peripheral circuitry of the image display unit, is the same as that illustrated in FIG. 5, the description and illustration of the details of the whole configuration are omitted.

Figure 4:
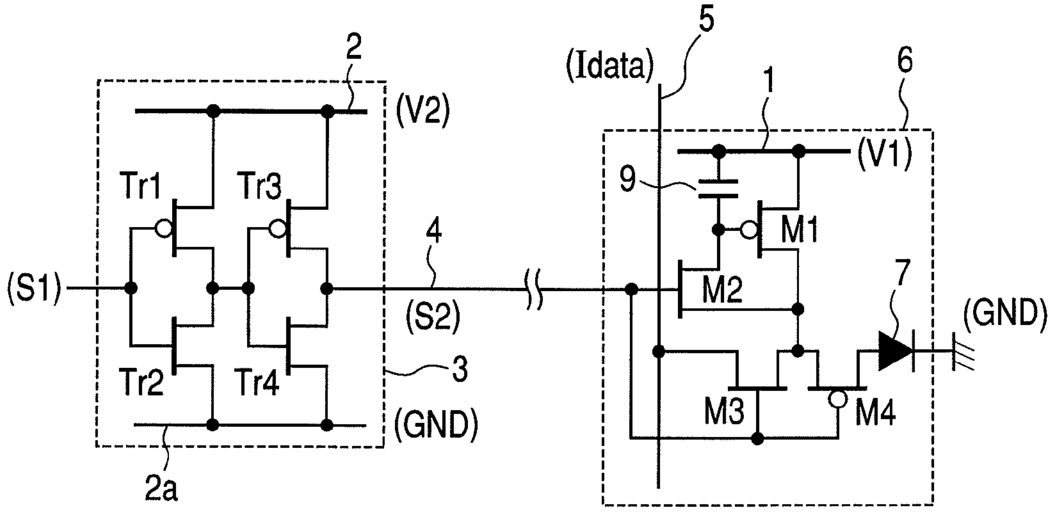
FIG. 4 (Prior Art)
FIG. 4 is a diagram illustrating an example of the circuit configuration of a conventional display apparatus.

The display apparatus of the present embodiment illustrated in FIG. 1 differs from the conventional display apparatus illustrated in FIG. 4 in that a switching element 8, made of a p type transistor (p type TFT), is provided between the first power supplying line 1 and the scanning line 4. The switching element 8 includes a gate terminal (control terminal), connected to the second power supplying line 2, a source terminal, connected to the first power supplying line 1, and a drain terminal, connected to the scanning line 4. The other parts of the configuration of the display apparatus of the present embodiment are the same as those of the conventional display apparatus, and the descriptions of the other parts are omitted accordingly.

Next, the operation of the present embodiment is described. Incidentally, the ordinary circuit operation of the display apparatus of the present embodiment is the same as that of the conventional display apparatus, and the description of the ordinary circuit operation is omitted accordingly.

First, the operation at the time of power source activation is described.

At the time of the power source activation, if the first power supplying line 1 is activated and the second power supplying line 2 is not activated yet, then the switching element 8 is turned on, and the potential level of the scanning line 4 becomes the potential V1 of the first power supplying line 1. At this time, the transistors M2 and M3 are turned on, and the transistor M4 is turned off. Hence, no currents flow through the EL element 7, and consequently the EL element 7 does not emit any light.

Moreover, the drive transistor M1 is made to be in a diode connection, in which the gate terminal of the drive transistor M1 is connected to the drain terminal thereof, because the transistor M2 is turned on. Since it is just after the power source activation, the data line drive circuit 21 (see FIG. 5) does not operate yet, and then the data line 5 is in its floating state. Consequently, the potential difference VGS between the gate of the drive transistor M1 and the source thereof becomes the threshold voltage Vth of the drive transistor M1. Thereby, the drain current of the drive transistor M1 becomes zero, and the potential difference VGS can be set to that at the time of the black display of the EL element 7.

Next, when it is started that the potential V2 of the second power supplying line 2 is powered on, the potential difference (V1−V2) between the potential V1 of the first power supplying line 1 and the potential V2 of the second power supplying line 2 becomes small. Then, when the potential difference (V1−V2) between the potential of the first power supplying line 1 and the potential of the second power supplying line 2 becomes smaller than the threshold value of the switching element 8, the switching element 8 is turned off. Thereby, the scanning line 4 is made to be non-connected with the first power supplying line 1, and the ordinary operation can be performed.

Next, the operation at the time of the turning-off of the power source is described.

At the time of the turning-off of the power source, if the second power supplying line 2 and the first power supplying line 1 are deactivated in this order, then the switching element 8 is turned on, and the scanning line 4 is connected to the first power supplying line 1. Consequently, the potential of the scanning line 4 becomes the high level. At this time, the transistors M2 and M3 are turned on, and the transistor M4 is turned off. Hence the pixel circuit 6 and the EL element 7 are made to be non-connected with each other, and the EL element 7 does not emit any light. Thus, the malfunctions at the time of the turning-off of the power source can be prevented.

As described above, the present embodiment is configured to make the potential of the signal S2 on the scanning line 4 to the first potential V1 by means of the switching element 8 according to the potential difference between the first potential V1 on the side of the first power supplying line 1 and the second potential V2 on the side of the second power supplying line 2. To put it more concretely, the present embodiment is configured to shift the potential of the scanning line 4 to the first potential V1 by means of the switching element 8 when the second potential V2 is lower than the first potential V1. Consequently, the malfunctions such as the uncontrolled light emission of the EL element 7 can be prevented with a simple circuit configuration and without increasing the circuit area of the display apparatus, regardless of the order of the power source activation at the time of the power source activation and the order of the power source deactivation at the time of the turning-off of the power source.

Second Embodiment

Next, a second embodiment of the present invention is described with reference to FIG. 2.

Figure 2:
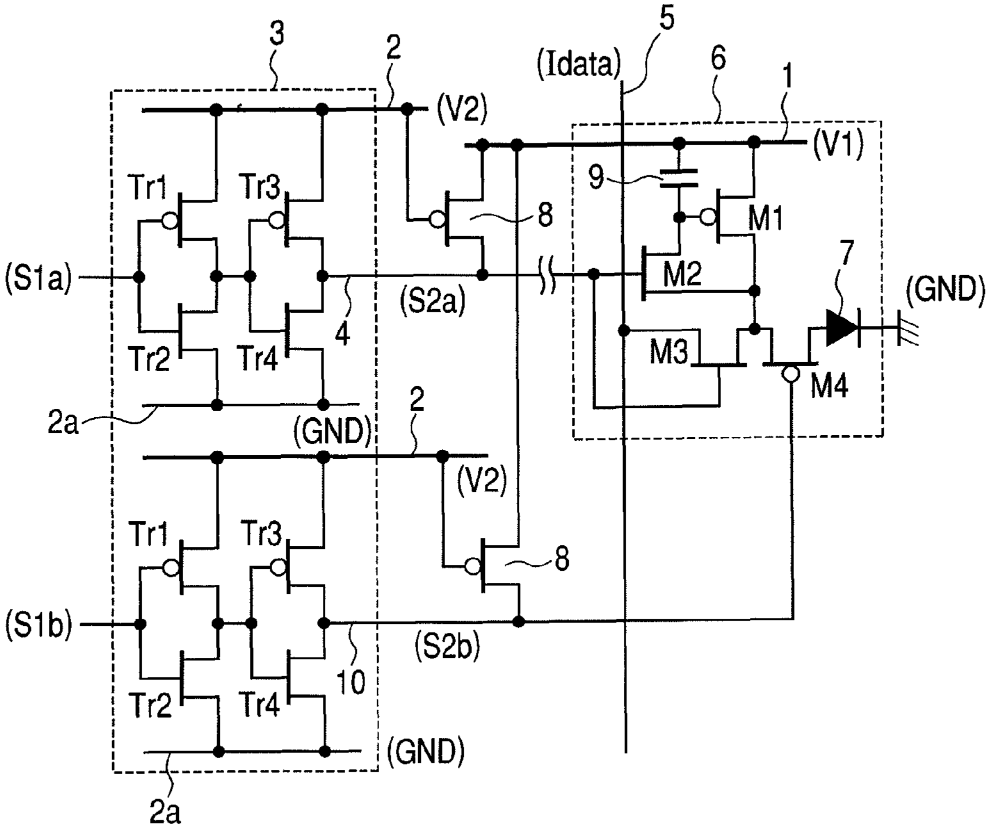
FIG. 2 is a diagram illustrating an example of the circuit configuration of a display apparatus according to a second embodiment of the present invention.

FIG. 2 illustrates an example of a part of the circuit configuration of the present embodiment in the case of including a plurality of scanning lines per pixel. The display apparatus of the present embodiment uses two scanning lines per row for performing row scanning, that is, the first scanning line 4 and a second scanning line 10.

The first scanning line 4 is a signal line for applying a signal S2*a* for setting the current signal data transmitted from one of the data lines 5 into the corresponding pixel circuit 6, to the gate terminals of the n type transistors M2 and M3 in the pixel circuit 6 in accordance with an input signal S1*a*. Moreover, the second scanning line 10 is a signal line for applying a signal S2*b* for controlling the light emission of the corresponding EL element 7 to the gate terminal of the p type transistor M4 in the pixel circuit 6 in accordance with an input signal S1*b*. In the present embodiment, the switching elements 8, each being the same as that of the FIG. 1, are severally arranged between the first scanning line 4 and the first power supplying line 1 and between the second scanning line 10 and the first power supplying line 1. The gate terminals (control terminals) of the two switching elements 8 are both connected to the second power supplying line 2.

Next, the operation of the present embodiment is described.

First, at the time of power source activation, if the first power supplying line 1 is activated and the second power supplying line 2 is not activated yet, then the switching elements 8 are turned on, and the potential levels of the first scanning line 4 and the second scanning line 10 are made to be the potential V1 of the first power supplying line 1. At this time, the transistors M2 and M3 are turned on, and the transistor M4 is turned off. Since no currents consequently flow through the EL element 7, no light emission of the EL element 7 is generated.

Moreover, since the transistor M2 is turned on, the drive transistor M1 is made to be in a diode connection, in which the gate terminal thereof is connected to the drain terminal thereof. Since it is just after the power activation, the data line drive circuit 21 (see FIG. 5) does not operate yet, and the data line 5 is in its floating state. Consequently, the potential difference VGS between the potential of the gate of the drive transistor M1 and the potential of the source thereof is made to be the threshold voltage Vth of the drive transistor M1. Hence the drain current of the drive transistor M1 becomes zero, and the potential difference VGS can be set to the potential difference at the time of the black display of the EL element 7.

Next, at the time of setting the current signal Idata transmitted from the data line 5 into the pixel circuit 6, both of potential levels of the signal S2*a* on the first scanning line 4 and the signal S2*b* on the second scanning line 10 are the high level. Then, the transistors M2 and M3 are on, and the transistor M4 is off. At the time of light emission, both of the potential levels of the first scanning line 4 and the second scanning line 10 are the low level. Then, the transistors M2 and M3 are off, and the transistor M4 is on. Consequently, the EL element 7 emits light of the brightness according to the current generated by the drive transistor M1.

Next, at the time of the turning-off of the power source, if the second power supplying line 2 and the first power supplying line 1 are deactivated in this order, then the switching elements 8 are turned on, and the first scanning line 4 and the second scanning line 10 are connected to the first power supplying line 1. Consequently, the potential of the first scanning line 4 and the second scanning line 10 becomes the high level. At this time, the transistors M2 and M3 are turned on, and the transistor M4 is turned off. Hence, the pixel circuit 6 and the EL element 7 are made to be non-connected with each other, and the EL element 7 does not emit any light. Thus, the malfunctions at the time of the turning-off of the power source can be prevented.

Consequently, also in the present embodiment, similarly to the case of FIG. 1, by the provision of the switching elements 8, malfunctions such as the uncontrolled light emission of the EL element 7 can be prevented with a simple circuit configuration and without increasing the circuit area of the display apparatus at the time of power source activation and at the time of the turning-off of the power source. Moreover, when the first power supplying line 1 is activated and the second power supplying line 2 is not activated yet, the drive transistor M1 is made to be in a diode connection, in which the gate terminal of the drive transistor M1 and the drain terminal thereof is connected to each other through the transistor M2. Consequently, the potential difference between the source of the drive transistor M1 and the gate thereof can be set to the threshold voltage of the drive transistor M1.

Incidentally, in the present embodiment, the two scanning lines 4 and 10 are provided as illustrated in FIG. 2, but the number of the scanning lines is not limited to that number. For example, three scanning lines may be provided, and the configuration in which a scanning line is provided to each of the control terminals of the transistors M2, M3, and M4 in FIG. 2 may be used.

Third Embodiment

Next, a third embodiment of the present invention is described with reference to FIG. 3.

Figure 3:
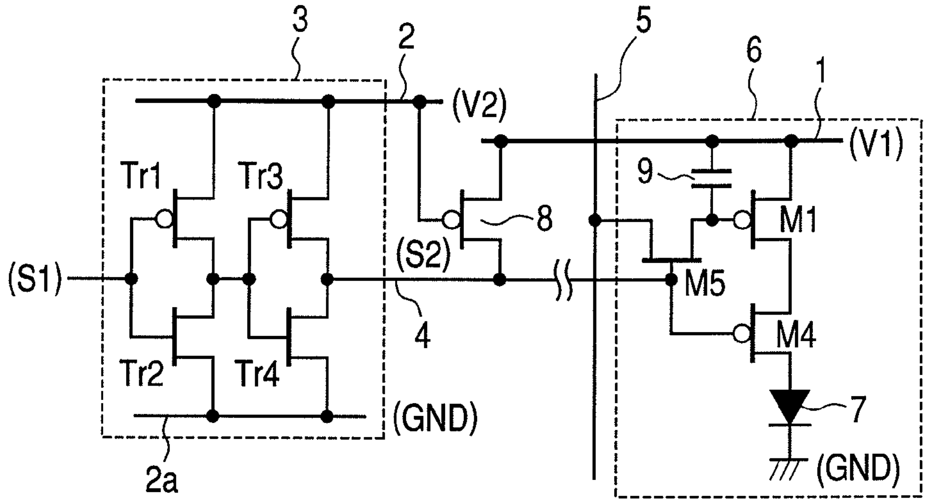
FIG. 3 is a diagram illustrating an example of the circuit configuration of a display apparatus according to a third embodiment of the present invention.

FIG. 3 illustrates an example of a part of the circuit configuration of a display apparatus including pixel circuits using a voltage setting method of the present embodiment.

The display apparatus of the present embodiment illustrated in FIG. 3 is provided with an n type transistor (n type TFT) M5 as a switching element between the data line 5 and the gate terminal of the drive transistor M1 in each of the pixel circuits 6 in place of the n type transistors M2 and M3 as the switching elements illustrated in FIG. 1. The other parts of the configuration of the display apparatus of the present embodiment are the same as those of the display apparatus illustrated in FIG. 1.

Next, the operation of the present embodiment is described.

First, at the time of power source activation, if the first power supplying line 1 is activated and the second power supplying line 2 is not activated yet, then the switching element 8 is turned on. Consequently, the scanning line 4 is connected to the first power supplying line 1, and the potential level of the signal S2 on the scanning line 4 is the high level. Then, the transistor M4 is turned off, and the transistor M5 is turned on. Hence, since the transistor M4 is off, the drive transistor M1 and the EL element 7 are non-connected to each other, and the EL element 7 does not emit any light.

Next, at the time of the ordinary operation of the display apparatus, both of the first power supplying line 1 and the second power supplying line 2 are powered on, and the potential difference between the potential of the first power supplying line 1 and the potential of the second power supplying line 2 is lower than the threshold value of the switching element 8, in which situation the switching element 8 is turned off. Consequently, the scanning line 4 is made to be non-connected to the first power supplying line 1, and the ordinary operation can be performed.

Next, at the time of the turning-off of the power source, if the first power supplying line 1 is powered on and the second power supplying line 2 is powered off, then the switching element 8 is turned on. Consequently, the potential level of the signal S2 on the scanning line 4 becomes the high level. Then, the transistor M5 is turned on, and the transistor M4 is turned off. Hence, since the drive transistor M1 and the EL element 7 are made to be non-connected to each other, no uncontrolled light emission of the EL element 7 is generated.

Consequently, also in the present embodiment, similarly to the first embodiment, the malfunctions such as the uncontrolled light emission of the EL element 7 can be prevented with a simple circuit configuration and without increasing the circuit area of the display apparatus at the time of power source activation and at the time of the turning-off of the power source.

As described above, it is possible to prevent the malfunctions such as the uncontrolled light emission of the EL elements 7 regardless of the order of power source activation and the order of the turning-off of the power source in the display apparatus provided with the plurality of power source systems (first power supplying line 1 and second power supplying line 2).

Incidentally, it is preferable that the potential of the second power supplying line 2 is larger than the potential of the first power supplying line 1 between the potential of the power supplying lines 1 and 2 of the present invention, but the present invention is not limited to such a configuration. For example, if the potential of the first power supplying line 1 is larger than the potential of the second power supplying line 2, then the present invention can be applied into such a case as long as the potential difference between the first and second power supplying lines 1 and 2 is smaller than the threshold value of the switching element 8.

Moreover, although the two kinds of the pixel circuit configurations of the current setting method and the voltage setting method have been described about the circuit configurations in FIGS. 1-3 in the above-mentioned embodiments, the circuit configurations of the present invention are not limited to the above two kinds of ones.

Moreover, the display apparatus of the embodiments described above exemplify the ones using EL elements 7 as the electro-optic elements, but the display apparatus are not limited to the ones using the EL elements 7. The other type display apparatus may be used as long as the present invention can be applied to the display apparatus.

The present invention is effective in the case where the output of a logic circuit made of an integrated circuit is needed to output the high level in the state in which the power supplying lines of the logic circuit may be fed with power.

For example, the present invention can be applied to an integrated circuit (logic circuit) including a first power supplying line, a second power supplying line, a first circuit unit connected to the first power supplying line, and a second circuit unit connected to the second power supplying line. In the integrated circuit, the input of the first circuit unit is connected to the output of the second circuit unit, and the output of the second circuit unit is made to be the potential of the first power supplying line according to the potential difference between the first power supplying line and the potential of the second power supplying line.

While the present invention has been described with reference to exemplary embodiments, it is to be understood that the present invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-303063, filed on Nov. 22, 2007, which is hereby incorporated by reference herein in its entirety.

What is claimed is:

1. A display apparatus comprising:

an image display unit including a plurality of electro-optic elements and a plurality of pixel circuits for respectively driving the plurality of electro-optic elements, the electro-optic elements and the pixel circuits being arranged in a row direction and a column direction of a matrix form;

a first power supplying line for supplying a first potential to the image display unit;

a plurality of data lines connected respectively to the pixel circuits arranged in the column direction for supplying data signals to the pixel circuits;

a data line drive circuit for driving the plurality of data lines;

a plurality of scanning lines connected respectively to the pixel circuits arranged in the row direction for selecting the pixel circuits;

a scanning line drive circuit for driving the plurality of scanning lines; and a second power supplying line for supplying a second potential to the scanning line drive circuit, wherein the display apparatus is provided with elements for shifting potential of the plurality of scanning lines to the first potential when the first potential and the second potential are different from each other.

2. The display apparatus according to claim 1, wherein the elements shift the potential of the plurality of scanning lines to the first potential when the second potential is lower than the first potential.

3. The display apparatus according to claim 2, wherein each of the elements includes a switching element provided between the first power supplying line and each of the plurality of scanning lines, and a control terminal of the switching element is connected to the second power supplying line.

4. The display apparatus according to claim 1, wherein the electro-optic elements are electroluminescence elements.

* * * * *